United States Patent [19]

Gay et al.

[11] 3,855,305

[45] Dec. 17, 1974

[54] METHOD FOR PREPARING AROMATIC ALDEHYDES

[75] Inventors: Walter A. Gay, Cheshire; Maurice A. Raymond, Northford, both of Conn.

[73] Assignee: Olin Corporation, New Haven, Conn.

[22] Filed: Feb. 7, 1972

[21] Appl. No.: 224,272

[52] U.S. Cl............... 260/600, 260/599, 260/523 R
[51] Int. Cl........................................... C07c 45/16
[58] Field of Search................. 260/599, 600, 566 F

[56] References Cited
UNITED STATES PATENTS

| | | | |
|---|---|---|---|
| 2,883,426 | 4/1959 | Brackman | 260/599 |
| 3,321,526 | 5/1967 | Marchand et al. | 260/600 |
| 3,364,219 | 1/1968 | Albright | 260/599 |
| 3,444,216 | 5/1969 | Parikh et al. | 260/599 |

FOREIGN PATENTS OR APPLICATIONS

| | | | |
|---|---|---|---|
| 10,689 | 5/1897 | Great Britain | 260/599 |

OTHER PUBLICATIONS

Miller et al., A Shorter Sidgwick's Organic Chemistry of Nitrogen (1969) 50–51

*Primary Examiner*—Bernard Helfin
*Attorney, Agent, or Firm*—Eugene Zagarella, Jr.

[57] ABSTRACT

The method for preparing aromatic aldehydes from their methylol analogs by air oxidation in the presence of an amine.

10 Claims, No Drawings

METHOD FOR PREPARING AROMATIC ALDEHYDES

The invention herein described was made in the course of or under a contract or subcontract thereunder, with the Air Force.

This invention relates to the preparation of aromatic aldehydes by a simplified and economical air oxidation method. More particularly, this invention involves the air oxidation of selected benzyl alcohols in the presence of selected primary amines.

Several methods are known for the preparation of aldehydes by oxidation of the corresponding alcohol, however, such methods generally involve the use of reagents which often involve troublesome procedures or lead to poor results. For example, the use of chromium trioxide-pyridine or t-butyl chromate as shown in "Oxidation in Organic Chemistry" by K. B. Wiberg, Part A, page 69, Academic Press, Inc., New York, 1965, involves a dangerous preparation, a long reaction time and a difficult isolation procedure. Oxidations using manganese dioxide require a reagent having a reactivity that is quite difficult to prepare, see J. Org. Chem., R. J. Gritter et al, 24, 1051 (1959). Permanganate oxidations as shown in "Oxidation in Organic Chemistry," R. Stewart, Part A, page 2, Academic Press, Inc., New York, 1965, can be used only in the preparation of ketones since aldehydes are further oxidized.

Previous use of air oxidation to prepare aldehydes is also known but such techniques employ expensive catalysts such as platinum as shown in "Newer Methods of Preparative Organic Chemistry," K. Heyns et al, Vol. II, page 303, Academic Press, Inc., New York, 1963 or palladium as shown in U.S. Pat. No. 3,321,526.

Additional problems in oxidation techniques also arise because of the general instability of aldehydes which often results in the further oxidation of the product.

Now in accordance with the method of this invention, it has surprisingly and unexpectedly been found that an air oxidation technique can be utilized in preparing aromatic aldehydes without the necessity of expensive catalysts. Also significant in the method of this invention is the fact that the susceptibility of the aldehyde to further oxidation is greatly reduced.

The method of this invention involves the air oxidation of benzylic and other related alcohols while solubilized in the presence of an amine to form the respective aldehyde. More particularly, the method of this invention involves the preparation of aromatic aldehydes by the oxidation of selected benzyl alcohols with oxygen or a gas containing oxygen in the presence of a primary amine followed by acid hydrolysis and isolation. In this reaction, the amine acts as a trapping agent to form a Schiff base which is then hydrolyzed to form the desired aldehyde as shown by the following equation wherein for example, benzyl alcohol is the starting material and the amine used is aniline:

Besides the advantage of utilizing the air oxidation technique without the need for costly catalysts, the method of this invention avoids the difficulties normally attributed to the instability of aldehydes by the intermediate formation of a Schiff base prior to the conversion to aldehyde. This results in a significant reduction of acid formation and advantageously the yields are exceptionally high.

The starting material used in the method of this invention may be any aromatic methylol compound of the Huckel type. More particularly, the starting material may be benzyl alcohol and substituted benzyl alcohols. Generally any substituent which is more oxidatively stable than the methylol group may be substituted on the benzyl alcohol ring. Such substituents include alkyl, aryl, alkoxy, hydroxyl, carboxylic acid, halogen, e.g., chlorine, bromine, fluorine and iodine, and nitro groups. Reference in the specification and the claims to the term "benzyl alcohol" is intended to include unsubstituted benzyl alcohol as well as any substituted benzyl alcohols of the type noted above.

The essence of this invention resides in the use of a trapping agent to form a Schiff base. For this purpose, any amine and more particularly a primary amine having the general formula: $RNH_2$ may be used with R being an aliphatic or aromatic group containing up to 12 carbon atoms and such group being either substituted or unsubstituted. The aromatic amines are the most preferred for this purpose. Illustrative of the useful amines are the following compounds, methylamine, butylamine, hexylamine, cyclohexylamine, benzylamine, methylaniline, o-, m-, and p-toluidine, o-, m- and p-anisidine, etc. Further examples of the amines of the above type may be found in "Synthetic Organic Chemistry" by R. B. Wagner et al, John Wiley and Sons, Inc., 1953, Chapter 24.

The oxygen used in the method of this invention may be suplied by any oxygen containing material and more particularly may be supplied as a pure gas or as a dilute mixture such as air.

The hydrolysis of the Schiff base which is formed as an intermediate, may be accomplished by using a wide range of acids and more particularly a protic acid. More particularly preferred acids are the mineral acids such as sulfuric, hydrochloric, hydrobromic, phosphoric, nitric, etc.

Generally, the method of this invention can be carried out in the presence of a solvent. Any solvent that will solubilize the product and not explosively react with oxygen is useful with the organic solvents being particularly preferred. Suitable solvents include the aliphatic, cycloaliphatic and aromatic solvents including substituted derivatives thereof. Illustrative of the above compounds are the following: hexane, octane, methylene chloride, chloroform, carbon tetrachloride, trifluorotrichlorethane, cyclohexane, methylcyclohexane, benzene, toluene, xylene, chlorobenzene and benzotrifluoride. Further illustrations of the useful sol-

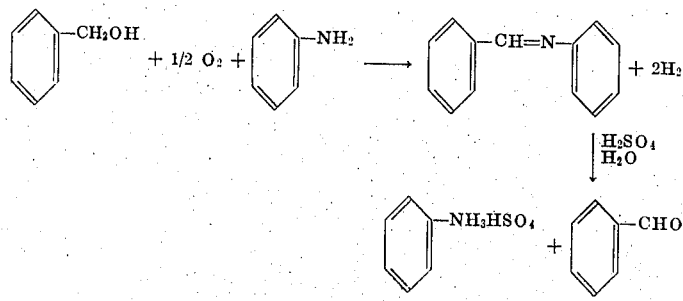

vents may be found in "Organic Solvents" edited by Weissburger et al, Vol. VII, 2nd edition, 1955.

Generally in carrying out the method of this invention the amount of amine trapping agent may vary widely. More particularly a molar ratio of amine to benzyl alcohol of from about 0.1:1 to about 100:1 and preferably from about 0.5:1 to about 5:1 may be used. Most preferred is a stoichiometric amount or slight excess of the amine.

The amount of oxygen which is used is not critical and may be varied widely with the limitation that there be at least a sufficient amount to permit the oxidation reaction to proceed. More particularly at least about 0.5 mole of oxygen per mole of benzyl alcohol should be used. However, much higher proportions of up to about 50 moles or more of oxygen per mole of benzyl alcohol may be used if desired.

The amount of acid used in the hydrolysis of the intermediate Schiff base must be at least suffficient to tie up the amine. More particularly, from about 0.1:1 to about 300:1 and preferably from about 0.5:1 to about 15:1 moles of acid per mole of benzyl alcohol may be used with a stoichiometric amount or slight excess being most preferred.

The reaction temperature generally will vary widely and more particularly will be from about 20 to about 500°C. and preferably from about 50° to 150°C. The reaction pressure also may vary widely and generally will range from atmospheric (0 psig) up to about 2,000 psig.

Isolation of the aromatic aldehyde formed after hydrolysis may be by the usual techniques of distillation, filtration, and/or extraction.

The aldehydes prepared by the method of this invention contain a readily adaptable functional group and thus have a wide variety of uses. These compounds may be used in the preparation of dyes, pharmaceuticals and agricultural chemicals and particularly in the formation of cobalt chelates which are useful in controlling the amount of oxygen in hazardous activities such as the operation of aircraft.

The following examples further illustrate the method of this invention.

EXAMPLE I

A three-neck flask equipped with a stirrer, a fritted sparge tube, thermometer and condenser was charged with 5.0 g. of an oil consisting of 3-fluorosalicyl alcohol (2.4 g., 0.017 mole), and 3-fluorosalicylaldehyde (0.65 g., 0.005 mole). The remaining portion of the charged oil consisted of o-fluorophenol-formaldehyde resins. Additionally charged to the flask were p-toluidine (5.4 g., 0.05 mole) and 100 ml. of xylene. The reaction mixture was heated to 120°C. and approximately 100 ft.$^3$ oxygen passed through for 20 hours. After removal of the xylene solvent by flash distillation under aspirator pressure, the pot residue was treated with 10 g. (0.1 mole) sulfuric acid in 150 ml. water. Steam distillation yielded 1.5 g. (96 percent assay) 3-fluorosalicylaldehyde upon cooling the distillate. No alcohol was found in the distillate or pot residue by an ether extraction of both followed by VPC analysis. Yield of 3-fluorosalicylaldehyde corresponded to 32.5 percent in hand.

EXAMPLE II

The system as described in Example I was charged with 400 ml. xylene, 53.5 g. (0.5 mole) p-toluidine and 40 g. oil consisting of 3-fluorosalicyl alcohol (24.6 g., 0.18 mole) and 3-fluorosalicylaldehyde (8.7 g., 0.06 mole). The reaction mixture was heated to 120°C. and 285 ft.$^3$ oxygen was passed through for 19 hours. After removal of the xylene solvent by flash distillation at aspirator pressure, the pot residue was treated with 60 g. (0.6 mole) concentrated sulfuric acid dissolved in 500 ml. water and steam distilled to give 26.2 g. 3-fluorosalicylaldehyde (87.7 percent assay) upon cooling the distillate. No alcohol was found in the distillate or pot residue by ether extraction of both followed by VPC analysis. Yield of 3-fluorosalicylaldehyde for the oxidation corresponds to 57.7 percent.

What is claimed is:

1. A method for the preparation of an aromatic aldehyde comprising:
   a. reacting benzyl alcohol or substituted benzyl alcohol having a substituent selected from the group consisting of alkyl, aryl, alkoxy, hydroxyl, halogen, and nitro groups, with oxygen in the presence of a primary amine of the formula:

$$RNH_2$$

where R is an aliphatic or aromatic hydrocarbon of up to 12 carbon atoms or an anisyl group at a temperature of from about 20° to about 500°C. and wherein a molar ratio of said amine to said benzyl alcohol or substituted benzyl alcohol of from about 0.1:1 to about 100:1 is used, and
   b. hydrolyzing the resulting product with acid to form the respective aldehyde compound.

2. The method of claim 1 wherein a molar ratio of amine to benzyl alcohol or substituted benzyl alcohol of from about 0.5 to about 5:1 is used.

3. The method of claim 1 wherein at least about 0.5 mole of oxygen per mole of benzyl alcohol or substituted benzyl alcohol is used.

4. The method of claim 3 wherein the reaction temperature is from about 50° to about 150°C.

5. The method of claim 4 wherein said amine is an aromatic amine.

6. The method of claim 5 wherein said acid is a mineral acid and a molar ratio of acid to benzyl alcohol or substituted benzyl alcohol of from about 0.1:1 to about 300:1 is used.

7. The method of claim 6 wherein said benzyl alcohol or substituted benzyl alcohol has a halogen substituent thereon.

8. The method of claim 7 wherein said benzyl alcohol or substituted benzyl alcohol is 3-fluorosalicyl alcohol.

9. The method of claim 8 wherein the reaction is conducted in the presence of an organic solvent.

10. The method of claim 9 wherein said amine is p-toluidine, said acid is sulfuric acid and said solvent is xylene.

* * * * *